United States Patent
Hamad (10) Patent No.: US 11,187,124 B2
(45) Date of Patent: Nov. 30, 2021

(54) INTERNAL COMBUSTION ENGINE SYSTEMS INCLUDING CRITERIA POLLUTANT MITIGATION

(71) Applicant: Saudi Arabian Oil Company, Dhahran (SA)

(72) Inventor: Esam Z. Hamad, Brighton, MI (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/733,928

(22) Filed: Jan. 3, 2020

(65) Prior Publication Data

US 2021/0207511 A1 Jul. 8, 2021

(51) Int. Cl.
*F01N 3/05* (2006.01)
*F01N 3/08* (2006.01)
(Continued)

(52) U.S. Cl.
CPC ....... *F01N 3/0814* (2013.01); *B01D 53/9481* (2013.01); *B01D 53/9495* (2013.01);
(Continued)

(58) Field of Classification Search
CPC ........ F01N 3/05; F01N 3/0807; F01N 3/0814; F01N 3/0835; F01N 3/0842;
(Continued)

(56) References Cited

U.S. PATENT DOCUMENTS 8,341,946 B2   1/2013   Harmsen
9,016,047 B2   4/2015   Gonze et al.
(Continued)

FOREIGN PATENT DOCUMENTS

DE   102008042767 A1   4/2010
EP   1281842 A2        2/2003
(Continued)

OTHER PUBLICATIONS

International Search Report and Written Opinion dated Feb. 22, 2021 pertaining to International application No. PCT/US2020/066514 filed Dec. 22, 2020, 16 pgs.

*Primary Examiner* — Audrey B. Walter
(74) *Attorney, Agent, or Firm* — Dinsmore & Shohl LLP (57) ABSTRACT

A method for operating an internal combustion engine includes combusting a fuel and air mixture within a combustion chamber of an internal combustion engine, thereby forming an exhaust gas, passing the exhaust gas out of the combustion chamber, performing a startup procedure, the startup procedure including passing the exhaust gas from the combustion chamber to a storage unit, capturing criteria pollutants of the exhaust gas with the storage unit, passing the exhaust gas from the storage unit to an aftertreatment system, heating the aftertreatment system to an activation temperature with the exhaust gas from the storage unit, and subsequent to heating the aftertreatment system to the activation temperature, performing a secondary procedure, the secondary procedure including passing the exhaust gas from the combustion chamber to the aftertreatment system thereby forming a treated exhaust gas, and passing the treated exhaust gas to the storage unit.

19 Claims, 4 Drawing Sheets

(51) Int. Cl.
*F01N 3/20* (2006.01)
*F01N 5/02* (2006.01)
*F01N 9/00* (2006.01)
*F01N 11/00* (2006.01)
*F01N 13/00* (2010.01)
*B01D 53/94* (2006.01)

(52) U.S. Cl.
CPC ............ *F01N 3/05* (2013.01); *F01N 3/0807* (2013.01); *F01N 3/0835* (2013.01); *F01N 3/0842* (2013.01); *F01N 3/0857* (2013.01); *F01N 3/2006* (2013.01); *F01N 3/2053* (2013.01); *F01N 5/02* (2013.01); *F01N 9/00* (2013.01); *F01N 11/002* (2013.01); *F01N 13/009* (2014.06); *F01N 2570/10* (2013.01); *F01N 2570/12* (2013.01); *F01N 2570/14* (2013.01)

(58) Field of Classification Search
CPC ........ F01N 3/0857; F01N 3/2006; F01N 5/02; F01N 9/00; F01N 11/002; F01N 13/009; F01N 2570/10; F01N 2570/12; F01N 2570/14; B01D 53/9481; B01D 53/9495
See application file for complete search history.

(56) References Cited

U.S. PATENT DOCUMENTS

| | | | |
|---|---|---|---|
| 9,180,401 B2 | 11/2015 | Hamad | |
| 9,587,583 B2 | 3/2017 | Caruel et al. | |
| 2001/0013223 A1* | 8/2001 | Boegner | F01N 3/2093 60/295 |
| 2008/0241032 A1 | 10/2008 | Zuberi | |
| 2009/0183498 A1* | 7/2009 | Uchida | F01N 3/0835 60/288 |
| 2010/0043404 A1 | 2/2010 | Hebbale et al. | |
| 2010/0205936 A1* | 8/2010 | Suzuki | F01N 3/2093 60/274 |
| 2010/0223921 A1* | 9/2010 | Uhrich | F01N 3/0807 60/311 |
| 2014/0234190 A1 | 8/2014 | McKenna | |

FOREIGN PATENT DOCUMENTS

| | | |
|---|---|---|
| JP | 05321649 A * | 12/1993 |
| WO | 9820238 A1 | 5/1998 |
| WO | 2000028196 A1 | 5/2000 |
| WO | 2007083639 A1 | 7/2007 |
| WO | 2008142999 A1 | 11/2008 |

* cited by examiner

INTERNAL COMBUSTION ENGINE SYSTEMS INCLUDING CRITERIA POLLUTANT MITIGATION

BACKGROUND

Field

The present disclosure relates to internal combustion engine systems, and more particularly, to internal combustion engine systems including features for mitigating the release of criteria pollutants.

Technical Background

Petroleum-based fuels are used to power the vast majority of vehicles. For example, gasoline, diesel fuel, and natural gas are relatively inexpensive and widely available for users, and are utilized to power internal combustion engines of vehicles throughout the world. However, the combustion of petroleum-based fuels may release pollutants into the environment, which may be undesirable for a number of reasons. Further, some pollutants released by the combustion of petroleum-based fuels are designated as "criteria pollutants," subject to regulation by various jurisdictions. As other more clean sources of energy for use with transportation vehicles may be too costly and underdeveloped, internal combustion engines are needed which can operate with reduced emission of criteria pollutants.

BRIEF SUMMARY

One strategy for reducing the emission of criteria pollutants includes the utilization of aftertreatment systems. For example, some aftertreatment systems may include a catalyst or catalysts that react with criteria pollutants to reduce undesirable emissions. However, the effectiveness of the catalysts may depend at least partially on the temperature of the catalysts, and the catalysts may need to reach an operating temperature to effectively react with criteria pollutants. In some operating conditions, such as during engine startup, the catalysts of aftertreatment systems may be below the operating temperature, and the performance of the aftertreatment systems may be decreased, leading to increased criteria pollutant emission.

Accordingly, a need exists for improved internal combustion engine systems that reduce the emission of criteria pollutants. Embodiments of the present disclosure are directed to internal combustion engine systems that include an aftertreatment system and a storage unit that is structurally configured to capture one or more criteria pollutants. Exhaust gas is preferentially routed to the storage unit before being passed to the aftertreatment system during a startup procedure. The storage unit captures criteria pollutants as the aftertreatment system is heated to an operating temperature, and in this way the emission of criteria pollutants during startup conditions may be minimized.

In one embodiment, a method for operating an internal combustion engine includes combusting a fuel and air mixture within a combustion chamber of an internal combustion engine, thereby forming an exhaust gas, passing the exhaust gas out of the combustion chamber, performing a startup procedure, the startup procedure including passing the exhaust gas from the combustion chamber to a storage unit, capturing criteria pollutants of the exhaust gas with the storage unit, passing the exhaust gas from the storage unit to an aftertreatment system, heating the aftertreatment system to an activation temperature with the exhaust gas from the storage unit, and subsequent to heating the aftertreatment system to the activation temperature, performing a secondary procedure, the secondary procedure including passing the exhaust gas from the combustion chamber to the aftertreatment system, reacting criteria pollutants of the exhaust gas with the aftertreatment system, thereby forming a treated exhaust gas, where the treated exhaust gas includes less criteria pollutants than the exhaust gas from the combustion chamber, and passing the treated exhaust gas to the storage unit.

In another embodiment, an internal combustion engine system includes a combustion chamber, a storage unit in selective communication with the combustion chamber, where the storage unit is structurally configured to capture one or more criteria pollutants in a gas passing through the storage unit, an aftertreatment system in selective communication with the combustion chamber and in selective communication with the storage unit, where the aftertreatment system is structurally configured to react with one or more criteria pollutants in a gas passing through the aftertreatment system, an aftertreatment-storage unit valve positioned between the combustion chamber and the storage unit and between the combustion chamber and the aftertreatment system, where the aftertreatment-storage unit valve is repositionable between a storage position, in which the combustion chamber and the storage unit are in communication with one another through the aftertreatment-storage unit valve, and an aftertreatment position, in which the combustion chamber is in communication with the aftertreatment system through the aftertreatment-storage unit valve, and a controller communicatively coupled to the aftertreatment-storage unit valve, the controller including a processor and a computer readable and executable instruction set, which when executed, causes the processor to execute a startup procedure, the startup procedure including directing the aftertreatment-storage unit valve into the storage position, thereby directing exhaust gas from the combustion chamber to the storage unit, and execute a secondary procedure, the secondary procedure including directing the aftertreatment-storage unit valve to move into the aftertreatment position, thereby directing the exhaust gas from the combustion chamber to the aftertreatment system.

In yet another embodiment, a method for operating an internal combustion engine system includes combusting a fuel and air mixture within a combustion chamber of an internal combustion engine, thereby forming an exhaust gas, performing a secondary procedure, the secondary procedure including passing the exhaust gas from the combustion chamber to an aftertreatment system, reacting the exhaust gas in the aftertreatment system, thereby forming a treated exhaust gas, where the treated exhaust gas includes less criteria pollutants than the exhaust gas from the combustion chamber, passing the treated exhaust gas to a storage unit, subsequent to performing the secondary procedure, performing a regeneration procedure, the regeneration procedure including passing the exhaust gas from the combustion chamber to the storage unit, heating the storage unit above a release temperature with the exhaust gas, thereby releasing stored criteria pollutants from the storage unit, passing the released criteria pollutants from the storage unit to the aftertreatment system, and reacting the released criteria pollutants with the aftertreatment system.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments described herein are generally directed to internal combustion engine systems and methods for operating internal combustion engine systems that mitigate the emission of criteria pollutants. In embodiments described herein, internal combustion engine systems include an aftertreatment system and a storage unit that are in selective communication with a combustion chamber. During startup conditions, exhaust gas is routed to the storage unit, which captures criteria pollutants from the exhaust gas while the aftertreatment system is heated to an activation temperature. Once the aftertreatment system is heated to the activation temperature, exhaust gas from the combustion chamber is routed through the aftertreatment system, which reacts with criteria pollutants within the exhaust gas. By preferentially routing exhaust gas to the storage unit during startup, criteria pollutants that would otherwise be emitted from the internal combustion engine to the environment while the aftertreatment system is heated to the activation temperature are captured. These and other embodiments of internal combustion engine systems that mitigate criteria pollutant emission are disclosed in greater detail herein with reference to the appended figures.

Figure 1:
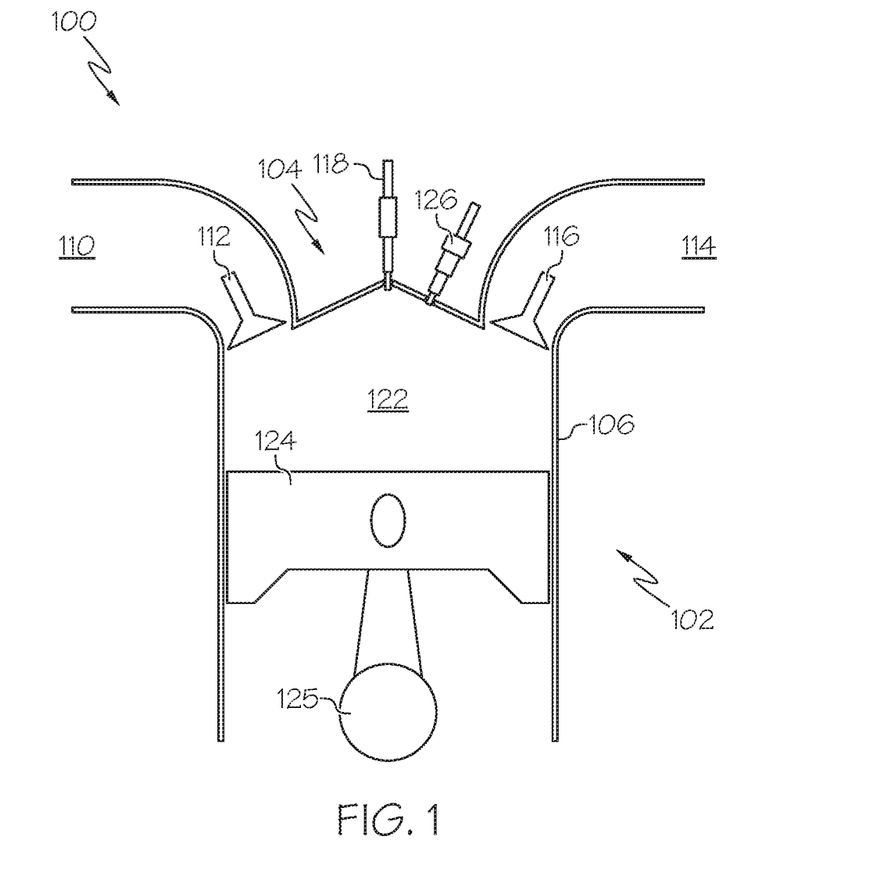
FIG. 1 schematically depicts a section view of an internal combustion engine of an internal combustion engine system, according to one or more embodiments shown and described herein.

Now referring to FIG. 1, a section view of an internal combustion engine 102 of an internal combustion engine system 100 is schematically depicted. The internal combustion engine 102 generally includes a cylinder head 104 engaged with a block that defines one or more sidewalls 106 that are engaged with the cylinder head 104. In embodiments, a piston 124 is engaged with the one or more sidewalls 106, and the piston 124, the cylinder head 104, and the one or more sidewalls 106 at least partially define a combustion chamber 122 in which fuel is combusted. In embodiments, the piston 124 is movable along the one or more sidewalls 106, for example, as fuel is combusted within the combustion chamber 122.

In embodiments, the piston 124 is coupled to a crankshaft 125. For example in the embodiment depicted in FIG. 1, the piston 124 is coupled to the crankshaft 125 through a connecting rod, and in operation, linear movement of the piston 124 along the one or more sidewalls 106 is converted into rotational movement of the crankshaft 125. In embodiments in which the internal combustion engine 102 is the engine of a vehicle, rotational movement of the crankshaft 125 may drive a wheel or wheels of the vehicle to provide the vehicle with mobility. In some embodiments, such as embodiments in which the internal combustion engine 102 is part of a power generation system, the crankshaft 125 may drive a generator that produces electrical current.

In embodiments, the internal combustion engine system 100 includes an intake valve 112 and an exhaust valve 116. The intake valve 112 and the exhaust valve 116 are each repositionable between an open position and a closed position, and can be moved between the open position and the closed position by any suitable device, such as and without limitation, a cam shaft or the like. Through selective movement of the intake valve 112, the combustion chamber 122 is in selective communication with an engine intake 110. In embodiments, the engine intake 110 may be an intake manifold or the like through which intake gas (e.g., air) is passed into the combustion chamber 122. In some embodiments, pressurized gas may be provided to the engine intake 110, such as through a turbocharger or supercharger, however, in some embodiments, the intake gas provided to the engine intake 110 is provided at an ambient pressure.

Through selective movement of the exhaust valve 116, the combustion chamber 122 is in selective communication with an engine exhaust 114. In some embodiments, the engine exhaust 114 may be an exhaust manifold or the like through which exhaust gas (e.g., combustion by-products from the combustion chamber 122) are passed after fuel is combusted within the combustion chamber 122. While in the embodiment depicted in FIG. 1, the internal combustion engine system 100 includes a single intake valve 112 and a single exhaust valve 116 in communication with the combustion chamber 122, it should be understood that this is merely an example, and embodiments described herein may include any suitable number of intake valves and exhaust valves in communication with the combustion chamber 122.

In embodiments, the internal combustion engine 102 includes a fuel injector 118 and an ignition device 120 in communication with the combustion chamber 122. The fuel injector 118 generally passes fuel, such as gasoline or the like, into the combustion chamber 122. In embodiments, the fuel injector 118 may include a multi-hole injector, a hollow cone injector, a piezo or solenoid-driven fuel injector, or the like.

The ignition device 120 may include a spark plug or the like that is operable to ignite or assist igniting fuel within the combustion chamber 122. While in the embodiment depicted in FIG. 1 the internal combustion engine 102 includes the ignition device 120, it should be understood that this is merely an example. For example, in some embodiments the internal combustion engine 102 may be a spark-ignition engine, and the ignition device 120 may ignite a fuel such as gasoline within the combustion chamber 122. However, in some embodiments, the internal combustion engine 102 may be a compression-ignition engine that may or may not include an ignition device, and may operate using a fuel such as gasoline, diesel fuel, natural gas, or the like.

While in the section view shown in FIG. 1, a single combustion chamber 122 is schematically depicted, it should be understood that the internal combustion engine 102 may include any suitable number of combustion chambers 122. Further, while in the embodiment depicted in FIG. 1, the internal combustion engine 102 includes the fuel injector 118 that is in direct communication with the combustion chamber 122, it should be understood that this is merely an example, and fuel can be indirectly passed into the combustion chamber 122, for example through the engine intake 110.

Figure 2:
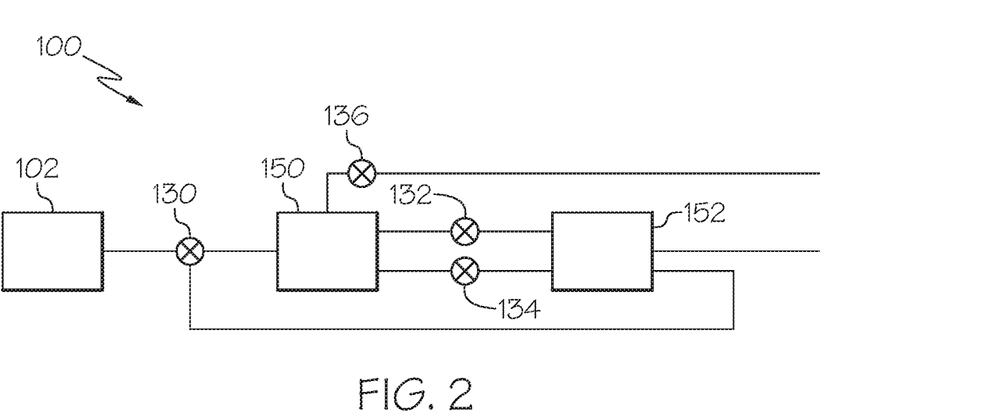
FIG. 2 schematically depicts an aftertreatment system and a storage unit of the internal combustion engine system of FIG. 1, according to one or more embodiments shown and described herein.

Referring to FIG. 2, a schematic view of the internal combustion engine system 100 is depicted. In embodiments, the internal combustion engine system 100 includes an aftertreatment system 150 and a storage unit 152 that are in selective communication with the internal combustion engine 102.

In embodiments, the aftertreatment system 150 is structurally configured to react with one or more criteria pollutants in a gas passing through the aftertreatment system 150 (e.g., exhaust gas). In particular, the aftertreatment system 150 includes one or more catalysts that react with one or more criteria pollutants, chemically converting the criteria pollutants to components that are not designated as criteria pollutants. As referred to herein, the term "criteria pollutants" includes pollutants that may be regulated by one or more jurisdictions and includes at least one of carbon monoxide (CO), nitrogen oxides ($NO_x$), and/or unburnt hydrocarbons (HCs).

In some embodiments, for example in embodiments in which the internal combustion engine 102 is a spark-ignition engine, the aftertreatment system 150 may include a three-way catalyst that is structurally configured to react with CO, $NO_x$, and HCs. For example, the three-way catalyst may convert CO into carbon dioxide ($CO_2$), may convert NO into diatomic nitrogen ($N_2$) and water ($H_2O$), and may convert HCs into $H_2O$ and $CO_2$. In some embodiments, for example, in embodiments in which the internal combustion engine 102 is a compression-ignition engine such as a diesel engine, the aftertreatment system 150 may include a diesel oxidation catalyst (DOC) and a $NO_x$ reduction catalyst or catalyst system. In some embodiments, the DOC may convert CO into $CO_2$ and convert HCs into $H_2O$ and $CO_2$, while the $NO_x$ reduction catalyst converts $NO_x$ into $H_2O$ and $N_2$. In some embodiments, the $NO_x$ reduction catalyst may include lean $NO_x$ catalysts, such as a copper substituted zeolite ZSM-5 catalyst and/or a platinum/alumina catalyst. In some embodiments, the $NO_x$ reduction catalyst may include a selective catalyst reduction (SCR) system.

In some embodiments, the aftertreatment system 150 defines a "light-off" or activation temperature that corresponds to a minimum temperature at which a desired amount of criteria pollutants are converted. In some embodiments, the activation temperature of the aftertreatment system 150 is about 175 degrees Celsius. In some embodiments, the activation temperature of the aftertreatment system 150 is about 200 degrees Celsius. In some embodiments, the activation temperature of the aftertreatment system 150 is about 275 degrees Celsius.

The storage unit 152 is structurally configured to capture one or more criteria pollutants in a gas passing through the storage unit 152 (e.g., exhaust gas). For example, in some embodiments, the storage unit 152 comprises one or more structures and materials that adsorb one or more criteria pollutants. In embodiments, the storage unit 152 may include sorbent materials such as activated carbons, zeolites, metal organic frameworks, silica, alumina, metal oxides, surface modified sorbents and/or liquids supported on porous material, barium oxide, or the like. In embodiments, the storage unit 152 may include the sorbent materials, for example, as a coating on a monolithic structure or as particles retained in a bed. A vacuum pressure may be maintained or applied to the storage unit 152 in some embodiments. For example, in some embodiments, the internal combustion engine 102 is in fluid communication with the storage unit 152 (e.g., via the engine intake 110 (FIG. 1)), and can apply a vacuum pressure to the storage unit 152 under some operating conditions. In some embodiments, a vacuum pump or the like is in communication with the storage unit 152 and can apply a vacuum pressure to the storage unit 152. As described in greater detail herein, the application of a vacuum pressure to the storage unit 152 can aid the release of criteria pollutants from the storage unit 152. In some embodiments, the storage unit 152 may include different materials and/or different regions that are structurally configured to capture different criteria pollutants. For example, in some embodiments, the storage unit 152 includes zeolites for capturing HCs and CO and/or activated carbons for capturing HCs at comparatively low temperatures. In some embodiments, the storage unit 152 includes barium oxide for capturing $NO_x$.

In embodiments, the storage unit 152 may adsorb criteria pollutants at comparatively low operating temperatures as compared to temperatures at which the aftertreatment system 150 converts criteria pollutants. For example in some embodiments, the storage unit 152 adsorbs criteria pollutants at temperatures below 100 degrees Celsius. In some embodiments, the storage unit 152 adsorbs criteria pollutants at temperatures between 0 degrees Celsius and 100 degrees Celsius, inclusive of the endpoints. In some embodiments, the storage unit 152 adsorbs criteria pollutants at temperatures between −20 degrees Celsius and 100 degrees Celsius, inclusive of the endpoints. Because the storage unit 152 can adsorb criteria pollutants at comparatively low operating temperatures, the storage unit 152 can capture criteria pollutants while the aftertreatment system 150 heats to an operating temperature during a startup procedure, as described in greater detail herein.

In embodiments, the storage unit 152 desorbs criteria pollutants, thereby regenerating the storage unit 152 when the storage unit 152 is at temperatures exceeding a release temperature. As referred to herein, "release temperature" refers to a temperature of the storage unit 152 at which at least one of the criteria pollutants (e.g., CO, HCs, and $NO_x$) adsorbed by the storage unit 152 is released from the storage unit 152. Without being bound by theory, sorbents of the storage unit 152 may have an adsorption isotherm associated with particular criteria pollutants. The adsorption isotherm defines an equilibrium relationship among various aspects of the sorbents, for example, a temperature of the sorbent and/or a gas passing through the storage unit 152, a pressure of the gas passing through the storage unit 152, a concentration of a particular criteria pollutant in the gas passing through the storage unit 152, and a concentration of the particular criteria pollutant adsorbed on the sorbent.

In embodiments, the sorbents of the storage unit 152 may have an equilibrium temperature for each criteria pollutant at which there is no change in the concentration of the criteria pollutant in the gas passing through the storage unit 152 at a given pressure (i.e., a temperature at which the particular criteria pollutant is not adsorbed at the given pressure). The equilibrium temperature can be obtained from the adsorption isotherm of each of the criteria pollutants. At temperatures above the equilibrium temperature of a particular criteria pollutant, sorbents of the storage unit 152 generally release the criteria pollutant. Different criteria pollutants may have different equilibrium temperatures, and as referred to herein, the "release temperature" of the storage unit 152 is a temperature that is greater than at least one of the equilibrium temperatures of the criteria pollutants adsorbed by the storage unit 152. In embodiments, the amount and/or rate of a criteria pollutant desorbed by a sorbent of the storage unit 152 may depend on the temperature of the storage unit 152. For example, in some embodiments, a rate or amount of a criteria pollutant released by the storage unit 152 may be higher at temperatures that are comparatively high above the equilibrium temperature of the criteria pollutant, as compared to at temperatures that are comparatively closer to the equilibrium temperature of the criteria pollutant. However, it should be understood that the relationship between the temperature of the storage unit 152 and the amount and/or rate of a criteria pollutant released is not necessarily linear. For example, in some embodiments, the amount and/or rate of a particular criteria pollutant released by the storage unit 152 may decrease as temperatures continue to increase above the release temperature.

In some embodiments, the storage unit 152 desorbs criteria pollutants at temperatures exceeding 100 degrees Celsius. In some embodiments, the storage unit 152 desorbs criteria pollutants at temperatures exceeding 150 degrees Celsius. In some embodiments, the storage unit 152 desorbs criteria pollutants at temperatures exceeding 200 degrees Celsius. In some embodiments, the storage unit 152 desorbs criteria pollutants at temperatures exceeding 250 degrees Celsius. In some embodiments, the storage unit 152 desorbs criteria pollutants at temperatures exceeding 300 degrees Celsius. In some embodiments, the storage unit 152 desorbs criteria pollutants at temperatures exceeding 350 degrees Celsius. In some embodiments, the storage unit 152 desorbs criteria pollutants at temperatures exceeding 400 degrees Celsius. In some embodiments, the storage unit 152 desorbs criteria pollutants at temperatures exceeding 450 degrees Celsius. In some embodiments, the storage unit 152 desorbs criteria pollutants at temperatures exceeding 500 degrees Celsius. In some embodiments, the storage unit 152 desorbs criteria pollutants at temperatures between 100 degrees Celsius and 500 degrees Celsius, inclusive of the endpoints. In some embodiments, the storage unit 152 desorbs criteria pollutants at temperatures between 250 degrees Celsius and 500 degrees Celsius, inclusive of the endpoints. Without being bound by theory, the release temperature at which the storage unit 152 desorbs criteria pollutants depends at least in part on the structure and materials of the storage unit 152. In embodiments, the structure and materials of the storage unit 152 are generally selected such that the release temperature at which the storage unit 152 desorbs criteria pollutants is at or below a temperature of exhaust gas that can be preferentially directed to the storage unit 152 during some operating conditions (e.g., operating conditions other than startup). Further, the structure and materials of the storage unit 152 are generally selected to endure temperatures of exhaust gas that is preferentially directed to the storage unit 152 during some operating conditions (e.g., operating conditions other than startup). For example, in some embodiments, the internal combustion engine system 100 may be configured such that exhaust gas preferentially directed to the storage unit 152 (e.g., bypassing the aftertreatment system 150) is less than 1000 degrees Celsius when the exhaust gas reaches the storage unit 152.

In embodiments, an aftertreatment-storage unit valve 130 positioned between the combustion chamber 122 (FIG. 1) of the internal combustion engine 102 and the storage unit 152, and between the combustion chamber 122 (FIG. 1) of the internal combustion engine 102 and the aftertreatment system 150. In embodiments, the aftertreatment-storage unit valve 130 is positionable in a storage unit position, in which the combustion chamber 122 (FIG. 1) of the internal combustion engine 102 and the storage unit 152 are in communication with one another through the aftertreatment-storage unit valve 130.

Figure 3:
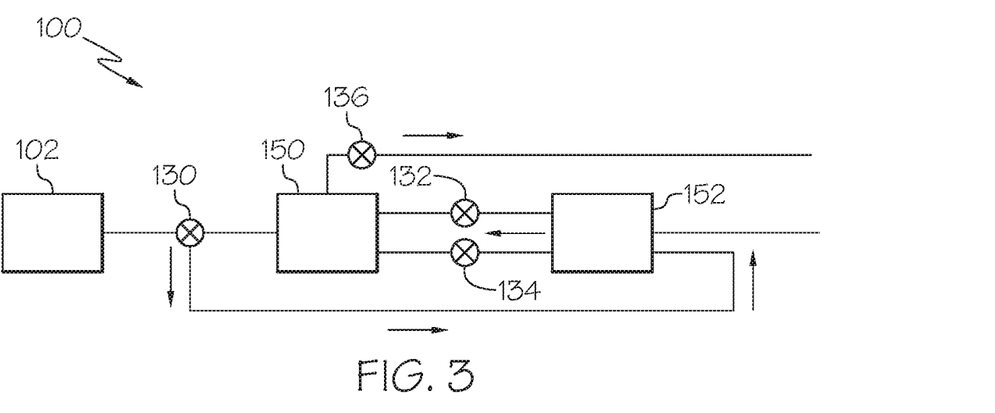
FIG. 3 schematically the internal combustion engine system of FIG. 1 in a startup or a regeneration procedure, according to one or more embodiments shown and described herein.

For example and referring to FIGS. 1 and 3, the internal combustion engine system 100 is depicted with the aftertreatment-storage unit valve 130 in the storage unit position. In operation, a fuel and air mixture is combusted within the combustion chamber 122 of the internal combustion engine 102, thereby forming an exhaust gas. With the aftertreatment-storage unit valve 130 in the storage unit position, such as during a startup procedure, the exhaust gas is passed out of the combustion chamber 122 of the internal combustion engine 102, and is passed to the storage unit 152 through the aftertreatment-storage unit valve 130 (e.g., bypassing the aftertreatment system 150). During the startup procedure, the storage unit 152 captures criteria pollutants of the exhaust gas, such that as the exhaust gas passes through the storage unit 152, the amount of criteria pollutants within the exhaust gas decreases. For example, during a startup procedure, the storage unit 152 may initially be at an ambient temperature that is below the release temperature of the storage unit 152. Accordingly, although comparatively high temperature exhaust gas is routed to the storage unit 152 bypassing the aftertreatment system 150, during the startup procedure, the storage unit 152 is below the release temperature, and may capture criteria pollutants within the exhaust gas. In some embodiments, 85% to 99% of the criteria pollutants that would otherwise be emitted while the aftertreatment system 150 is heated to the activation temperature are captured by the storage unit 152 during the first 120 seconds of operation of the internal combustion engine system 100.

From the storage unit 152, the exhaust gas passes to the aftertreatment system 150, for example, through a storage unit exit valve 134. In embodiments, the storage unit exit valve 134 may be a one-way valve that restricts the flow of gas from the aftertreatment system 150 to the storage unit 152, while allowing gas to flow from the storage unit 152 to the aftertreatment system 150. Additionally or alternatively, in some embodiments, the storage unit exit valve 134 may be repositionable between an open position, in which the aftertreatment system 150 and the storage unit 152 are in communication with one another through the storage unit exit valve 134, and a closed position, in which the aftertreatment system 150 and the storage unit 152 are not in communication with one another through the storage unit exit valve 134.

As the exhaust gas passes through the aftertreatment system 150, the exhaust gas heats the aftertreatment system 150. In embodiments, the exhaust gas from the storage unit 152 heats the aftertreatment system 150 to the activation temperature, thereby "lighting off" the one or more catalysts of the aftertreatment system 150, as described above. From the aftertreatment system 150, the exhaust gas may be passed through an aftertreatment exit valve 136, and may be passed to the environment or may be passed to further treatment systems of the internal combustion engine system 100. In embodiments, the aftertreatment exit valve 136 may be a one-way valve that restricts the flow of gas to the aftertreatment system 150 through the aftertreatment exit valve 136, while allowing gas to flow from the aftertreatment system 150 through the aftertreatment exit valve 136. Additionally or alternatively, in some embodiments, the aftertreatment exit valve 136 may be repositionable between an open position, in which gas may be passed from the aftertreatment system 150 through the aftertreatment exit valve 136, and a closed position, in which gas is restricted from flowing through the aftertreatment exit valve 136.

Figure 4:
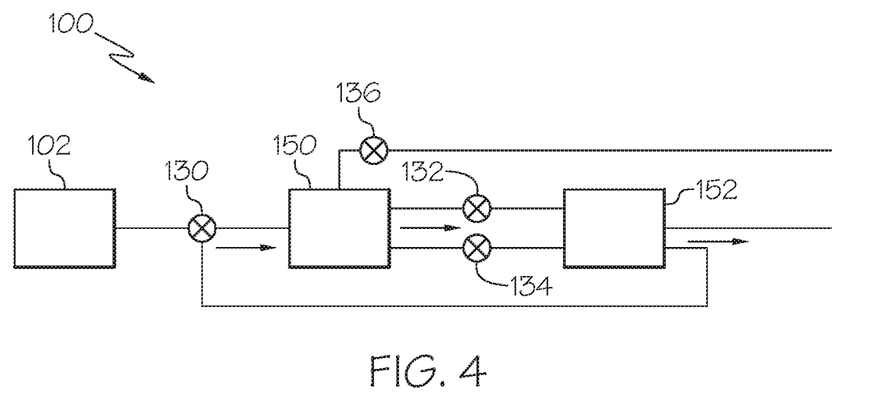
FIG. 4 schematically depicts the internal combustion engine system of FIG. 1 in a secondary procedure, according to one or more embodiments shown and described herein.

Once the aftertreatment system 150 is heated to the activation temperature, the aftertreatment-storage unit valve 130 is moved into an aftertreatment position, in which the combustion chamber 122 (FIG. 1) of the internal combustion engine 102 is in communication with the aftertreatment system 150 through the aftertreatment-storage unit valve 130, as shown in FIGS. 1 and 4.

In particular, once the aftertreatment system 150 is heated above the activation temperature, a secondary procedure is performed. With the aftertreatment-storage unit valve 130 in the aftertreatment position, exhaust gas from the combustion chamber 122 of the internal combustion engine 102 is passed to the aftertreatment system 150 through the aftertreatment-storage unit valve 130 (e.g., bypassing the storage unit 152). As the exhaust gas passes through the aftertreatment system 150, the one or more catalysts of the aftertreatment system 150 react with criteria pollutants with in the exhaust gas, as described above. In particular, as the exhaust gas passes through the aftertreatment system 150, the aftertreatment system 150 reacts with criteria pollutants of the exhaust gas forming a treated exhaust gas which has less criteria pollutants that the exhaust gas passing to the aftertreatment system 150 from the combustion chamber 122.

From the aftertreatment system 150, the treated exhaust gas is passed to the storage unit 152, for example through a storage unit inlet valve 132. In embodiments, the storage unit inlet valve 132 may be a one-way valve that allows gas to pass from the aftertreatment system 150 to the storage unit 152. Additionally or alternatively, in some embodiments, the storage unit inlet valve 132 may be repositionable between an open position, in which the aftertreatment system 150 and the storage unit 152 are in communication with one another through the storage unit inlet valve 132, and a closed position, in which the aftertreatment system 150 and the storage unit 152 are not in communication with one another through the storage unit inlet valve 132. As the treated exhaust gas passes through the storage unit 152, criteria pollutants that remain in the treated exhaust gas may be captured by the storage unit 152, as described above, further reducing the amount of criteria pollutants emitted from the internal combustion engine system 100.

In embodiments, the storage unit 152 may retain a finite amount of criteria pollutants. Accordingly, in embodiments, criteria pollutants may be periodically released (e.g., desorbed) from the storage unit 152. To release criteria pollutants from the storage unit 152, subsequent to the secondary procedure depicted in FIG. 4, the aftertreatment-storage unit valve 130 is repositioned into the storage unit position, as depicted in FIG. 3 as part of a regeneration procedure. Similar to the startup procedure outlined above, with the aftertreatment-storage unit valve 130 in the storage unit position, exhaust gas from the combustion chamber 122 (FIG. 1) of the internal combustion engine 102 passes to the storage unit 152 through the aftertreatment-storage unit valve 130 (e.g., bypassing the aftertreatment system 150). Because the exhaust gas from the combustion chamber 122 (FIG. 1) bypasses the aftertreatment system 150, the temperature of the exhaust gas may be at comparatively high temperatures, as compared to exhaust gas that is routed through the aftertreatment system 150 before reaching the storage unit 152. In embodiments, the exhaust gas heats the storage unit 152 above the release temperature of the storage unit 152, causing the storage unit 152 to release (e.g., desorb) criteria pollutants from the storage unit 152, as described above. In some embodiments, a vacuum pressure may also be applied to the storage unit 152 (e.g., via the internal combustion engine 102 and/or a vacuum pump) to assist in releasing criteria pollutants from the storage unit 152.

From the storage unit 152, the released criteria pollutants are passed to the aftertreatment system 150, for example through the storage unit exit valve 134. The aftertreatment system 150 reacts with the released criteria pollutants, and treated exhaust gas from the aftertreatment system 150 may be passed through the aftertreatment exit valve 136. By regenerating the storage unit 152 with exhaust gas, additional components such as external heaters that would otherwise be utilized to regenerate the storage unit 152 may be omitted.

Subsequent to performing the regeneration procedure as depicted in FIG. 3, the internal combustion engine system 100 may resume the secondary procedure depicted in FIG. 4, positioning the aftertreatment-storage unit valve 130 to the aftertreatment position.

Figure 5:
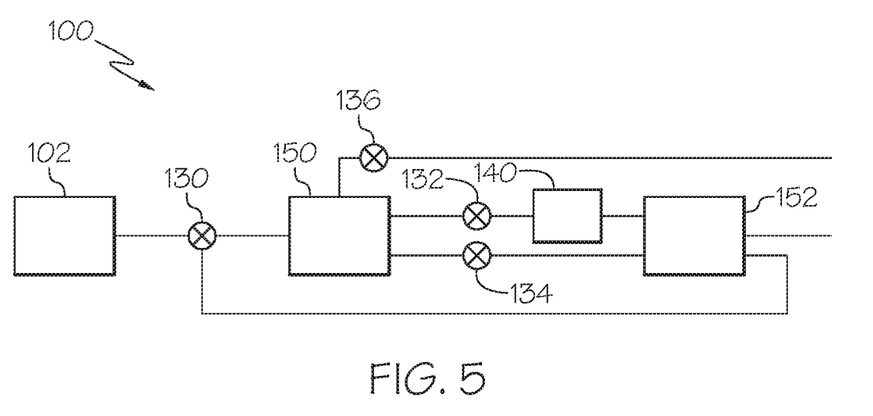
FIG. 5 schematically depicts an internal combustion engine system including a waste heat recovery unit, according to one or more embodiments shown and described herein.

Referring to FIG. 5, in some embodiments, the internal combustion engine system 100 includes a cooling unit 140 positioned between the aftertreatment system 150 and the storage unit 152. In some embodiments, the cooling unit 140 is a waste heat recovery unit structurally configured to cool gas passing from the aftertreatment system 150 to the storage unit 152, and may include for example and without limitation, an electric turbo compound (ETC), a thermoelectric generator (TEG), a Rankine cycle system, or the like. The waste heat recovery unit may assist in recovering thermal energy from the exhaust gas that would otherwise be lost, thereby increasing the efficiency of the internal combustion engine system 100. Further, the waste heat recovery unit may cool the exhaust gas passing from the aftertreatment system 150 to the storage unit 152, and may assist in ensuring that exhaust gas passing from the aftertreatment system 150 to the storage unit 152 is below the release temperature.

In some embodiments, the cooling unit 140 includes an air cooler or other similar heat exchanger. For example, in some embodiments, the cooling unit 140 dissipates heat from exhaust gas passing through the cooling unit 140 to ambient air surrounding the cooling unit 140, such as by passing ambient air over tubes or pipes carrying the exhaust gas. Similar to embodiments in which the cooling unit 140 is a waste heat recovery unit, the air cooler may assist in ensuring that exhaust gas passing from the aftertreatment system 150 to the storage unit 152 is below the release temperature. While in the embodiment depicted in FIG. 5, the internal combustion engine system 100 includes a single cooling unit 140, it should be understood that this is merely an example, and the internal combustion engine system 100 may include any suitable number of cooling units 140 positioned between the aftertreatment system 150 and the storage unit 152. Further, in embodiments that include multiple cooling units 140, the cooling units 140 may include similar construction (e.g., may each be waste heat recovery units or may each be air coolers, etc.), or may include different construction (e.g., some may be waste heat recovery units while others are air coolers, etc.).

By ensuring that the exhaust gas passing from the aftertreatment system 150 to the storage unit 152 is below the release temperature of the storage unit 152, the cooling unit 140 may assist in ensuring that criteria pollutants are not released from the storage unit 152 to the environment. In some embodiments, only a portion of the exhaust gas passing from the aftertreatment system 150 to the storage unit 152 is routed through the cooling unit 140, while in some embodiments, all of the exhaust gas passing from the aftertreatment system 150 to the storage unit 152 is routed through the cooling unit 140. In some embodiments, ambient air may be introduced to the exhaust gas passing from the aftertreatment system 150 to the storage unit 152 to control the temperature of the exhaust gas entering the storage unit 152, so as to maintain the storage unit 152 below the release temperature.

Figure 6:
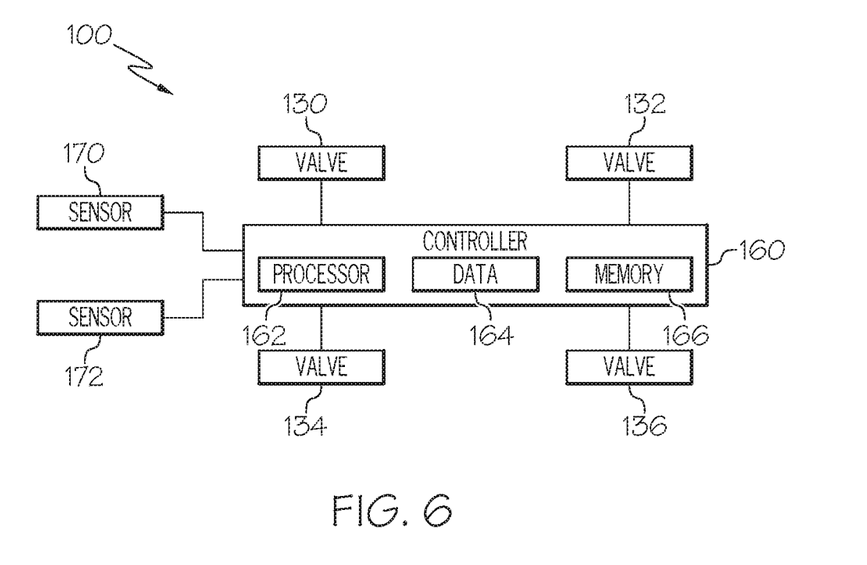
FIG. 6 schematically depicts a control diagram of an internal combustion engine system, according to one or more embodiments shown and described herein.

Referring to FIG. 6, in embodiments, the internal combustion engine system 100 includes a controller 160. As illustrated, the controller 160 includes a processor 162, a data storage component 164, and/or a memory component 166. The memory component 166 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the controller 160 and/or external to the controller 160.

The memory component 166 may store operating logic, analysis logic, and communication logic in the form of one or more computer readable and executable instruction sets. The analysis logic and the communication logic may each include a plurality of different pieces of logic, each of which may be embodied as a computer program, firmware, and/or hardware, as an example. A local interface is also included in the controller 160, and may be implemented as a bus or other communication interface to facilitate communication among the components of the controller 160.

The processor 162 may include any processing component operable to receive and execute instructions (such as from a data storage component 164 and/or the memory component 166). It should be understood that while the components in FIG. 6 are illustrated as residing within the controller 160, this is merely an example, and in some embodiments, one or more of the components may reside external to the controller 160. It should also be understood that, while the controller 160 is illustrated as a single device, this is also merely an example.

In embodiments, the controller 160 is communicatively coupled to one or more components of the internal combustion engine system 100. For example, in the embodiment depicted in FIG. 6, the controller 160 is communicatively coupled to the aftertreatment-storage unit valve 130, and in embodiments, the controller 160 directs the aftertreatment-storage unit valve 130 to move between the storage unit position (FIG. 3) and the aftertreatment position (FIG. 4).

In some embodiments, the controller 160 is communicatively coupled to one or more of the storage unit exit valve 134, the storage unit inlet valve 132, and the aftertreatment exit valve 136. The controller 160 may direct the storage unit exit valve 134, the storage unit inlet valve 132, and the aftertreatment exit valve 136 to move between their open and closed positions to direct exhaust gas from the combustion chamber 122 (FIG. 1) through the internal combustion engine system 100 described above and as depicted in FIGS. 3 and 4.

In some embodiments, the internal combustion engine system 100 further includes a temperature sensor 170 communicatively coupled to the controller 160. The temperature sensor 170 is structurally configured to detect a temperature of the aftertreatment system 150 (FIG. 2), and may send a signal to the controller 160 indicative of a detected temperature of the aftertreatment system 150 (FIG. 2). The detected temperature of the aftertreatment system 150 (FIG. 2) may be utilized to determine when to change from the startup procedure (FIG. 3) to the secondary procedure (FIG. 4) moving the aftertreatment-storage unit valve 130 from the storage position to the aftertreatment position. In embodiments, the controller 160 determines whether the detected temperature of the aftertreatment system 150 exceeds the activation temperature of the aftertreatment system 150. In response to determining that the detected temperature of the aftertreatment system 150 (FIG. 2) exceeds the activation temperature, the controller 160 directs the aftertreatment-storage unit valve 130 to move into the aftertreatment position (FIG. 4). As discussed above, with the aftertreatment-storage unit valve 130 in the aftertreatment position (FIG. 4), exhaust gas is routed from the combustion chamber 122 (FIG. 1) of the internal combustion engine 102 (FIG. 1) to the aftertreatment system 150 (FIG. 4), and then to the storage unit 152 (FIG. 4). In response to determining that the detected temperature of the aftertreatment system 150 (FIG. 2) does not exceed the activation temperature, the controller 160 directs the aftertreatment-storage unit valve 130 to move into or to remain in the storage unit position (FIG. 3). As discussed above, with the aftertreatment-storage unit valve 130 in the storage unit position (FIG. 3), exhaust gas from the combustion chamber 122 (FIG. 1) is directed to the storage unit 152 (FIG. 3), and then to the aftertreatment system 150 (FIG. 3), such that the storage unit 152 may capture criteria pollutants while the aftertreatment system 150 is heated.

In some embodiments, the internal combustion engine system 100 further includes a pollutant sensor 172 communicatively coupled to the controller 160. The pollutant sensor 172 is structurally configured to detect an amount of one or more criteria pollutants stored within the storage unit 152 (FIG. 2) and may send a signal to the controller 160 indicative of a detected amount of the one or more criteria pollutants within the storage unit 152 (FIG. 2). The detected amount of the one or more criteria pollutants within the storage unit 152 (FIG. 2) may be utilized to determine when to change from the secondary procedure (FIG. 4) to the regeneration procedure (FIG. 3), moving the aftertreatment-storage unit valve 130 from the aftertreatment position to the storage position. In embodiments, the controller 160 may determine whether the detected amount of the one or more criteria pollutants within the storage unit 152 (FIG. 2) exceeds a configurable threshold. In response to determining that the detected amount of the one or more criteria pollutants within the storage unit 152 (FIG. 2) exceeds the configurable threshold, the controller 160 directs the aftertreatment-storage unit valve 130 to move into the storage position (FIG. 3). As discussed above, with the aftertreatment-storage unit valve 130 in the storage unit position (FIG. 3), exhaust gas from the combustion chamber 122 (FIG. 1) is directed to the storage unit 152 (FIG. 3), and then to the aftertreatment system 150 (FIG. 3). The comparatively high temperature of the exhaust gas may cause the storage unit 152 (FIG. 3) to release (e.g., desorb) criteria pollutants from the storage unit 152 (FIG. 3) to the aftertreatment system 150 (FIG. 3). In response to determining that the detected amount of the one or more criteria pollutants within the storage unit 152 (FIG. 2) does not exceed the configurable threshold, the controller 160 directs the aftertreatment-storage unit valve 130 to remain into the aftertreatment position (FIG. 4).

While in the embodiment depicted in FIG. 6, the internal combustion engine system 100 includes the pollutant sensor 172, it should be understood that this is merely an example. For example, in some embodiments, the controller 160 may change from the secondary procedure (FIG. 4) to the regeneration procedure (FIG. 3) moving the aftertreatment-storage unit valve 130 from the aftertreatment position to the storage position, based on a predetermined elapsed time, thereby periodically releasing criteria pollutants from the storage unit 152 (FIG. 2).

Accordingly, it should now be understood that embodiments described herein are directed to internal combustion engine systems and methods for operating internal combustion engine systems that mitigate the emission of criteria pollutants. In embodiments described herein, internal combustion engine systems include an aftertreatment system and a storage unit that are in selective communication with a combustion chamber. During startup conditions, exhaust gas is routed to the storage unit, which captures criteria pollutants from the exhaust gas while the aftertreatment system is heated to an activation temperature. Once the aftertreatment system is heated to the activation temperature, exhaust gas from the combustion chamber is routed through the aftertreatment system, which reacts with criteria pollutants within the exhaust gas. By preferentially routing exhaust gas to the storage unit during startup, criteria pollutants that would otherwise be emitted from the internal combustion engine to the environment while the aftertreatment system is heated to the activation temperature are captured.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method for operating an internal combustion engine, the method comprising:
   combusting a fuel and air mixture within a combustion chamber of an internal combustion engine, thereby forming an exhaust gas;
   passing the exhaust gas out of the combustion chamber;
   performing a startup procedure, the startup procedure comprising:
      passing the exhaust gas from the combustion chamber to a storage unit comprising one or more sorbent materials;
      capturing criteria pollutants of the exhaust gas with the storage unit;
      passing the exhaust gas from the storage unit to an aftertreatment system comprising one or more catalysts;
      heating the aftertreatment system to an activation temperature with the exhaust gas from the storage unit; and
   subsequent to heating the aftertreatment system to the activation temperature, performing a secondary procedure, the secondary procedure comprising:
      passing the exhaust gas from the combustion chamber to the aftertreatment system;
      reacting criteria pollutants of the exhaust gas with the aftertreatment system, thereby forming a treated exhaust gas, wherein the treated exhaust gas comprises less criteria pollutants than the exhaust gas from the combustion chamber; and
      passing the treated exhaust gas to the storage unit.

2. The method of claim 1, wherein the secondary procedure further comprises capturing criteria pollutants from the treated exhaust gas with the storage unit.

3. The method of claim 1, wherein the criteria pollutants comprise at least one of carbon monoxide, nitrogen oxides, and hydrocarbons.

4. The method of claim 1, wherein the secondary procedure further comprises, prior to passing the treated exhaust gas to the storage unit, cooling the treated exhaust gas.

5. The method of claim 4, wherein cooling the treated exhaust gas comprises passing the treated exhaust gas through a cooling unit comprising at least one of an air cooler and a waste heat recovery unit comprising at least one of an electric turbo compound, a thermoelectric generator, and a Rankine cycle system.

6. The method of claim 1, further comprising, subsequent to performing the secondary procedure, performing a regeneration procedure, the regeneration procedure comprising:
   passing the exhaust gas from the combustion chamber to the storage unit; and
   heating the storage unit above a release temperature with the exhaust gas, thereby releasing stored criteria pollutants from the storage unit.

7. The method of claim 6, further comprising applying a vacuum pressure to the storage unit.

8. The method of claim 6, wherein the regeneration procedure further comprises passing the released criteria pollutants to the aftertreatment system.

9. The method of claim 6, further comprising, subsequent to performing the regeneration procedure, resuming the secondary procedure.

10. An internal combustion engine system comprising:
    a combustion chamber;
    a storage unit in selective communication with the combustion chamber, wherein the storage unit comprises one or more sorbent materials structurally configured to capture one or more criteria pollutants in a gas passing through the storage unit;
    an aftertreatment system comprising one or more catalysts in selective communication with the combustion chamber and in selective communication with the storage unit, wherein the aftertreatment system is structurally configured to react with one or more criteria pollutants in a gas passing through the aftertreatment system;
    a waste heat recovery unit positioned between the aftertreatment system and the storage unit, wherein the waste heat recovery unit comprises at least one of an electric turbo compound, a thermoelectric generator, and a Rankine cycle system and is structurally configured to cool gas passing from the aftertreatment system to the storage unit;
    an aftertreatment-storage unit valve positioned between the combustion chamber and the storage unit and between the combustion chamber and the aftertreatment system, wherein the aftertreatment-storage unit valve is repositionable between a storage position, in which the combustion chamber and the storage unit are in communication with one another through the aftertreatment-storage unit valve, and an aftertreatment position, in which the combustion chamber is in communication with the aftertreatment system through the aftertreatment-storage unit valve; and
    a controller communicatively coupled to the aftertreatment-storage unit valve, the controller comprising a processor and a computer readable and executable instruction set, which when executed, causes the processor to:
    execute a startup procedure, the startup procedure comprising:
       directing the aftertreatment-storage unit valve into the storage position, thereby directing exhaust gas from the combustion chamber to the storage unit bypassing the aftertreatment system; and
    execute a secondary procedure, the secondary procedure comprising:
       directing the aftertreatment-storage unit valve to move into the aftertreatment position, thereby directing the exhaust gas from the combustion chamber to the aftertreatment system.

11. The internal combustion engine system of claim 10, further comprising a temperature sensor communicatively coupled to the controller, wherein the temperature sensor is structurally configured to detect a temperature of the aftertreatment system.

12. The internal combustion engine system of claim 11, wherein the computer readable and executable instruction set, when executed, further causes the processor to:
    receive a signal from the temperature sensor indicative of a detected temperature of the aftertreatment system;
    determine whether the detected temperature of the aftertreatment system exceeds a activation temperature; and
    wherein directing the aftertreatment-storage unit valve to move into the aftertreatment position is in response to determining that the temperature of the aftertreatment system exceeds the activation temperature.

13. The internal combustion engine system of claim 10, further comprising a pollutant sensor communicatively coupled to the controller, wherein the pollutant sensor is structurally configured to detect an amount of one or more criteria pollutants stored within the storage unit.

14. The internal combustion engine system of claim 13, wherein the computer readable and executable instruction set, when executed, further causes the processor to:
    receive a signal from the pollutant sensor indicative of a detected amount of one or more criteria pollutants stored within the storage unit;
    determine whether the detected amount of the one or more criteria pollutants exceeds a configurable threshold; and
    in response to determining that the detected amount of the one or more criteria pollutants exceeds the configurable threshold, direct the aftertreatment-storage unit valve to move into the storage position, thereby directing the exhaust gas from the combustion chamber to the storage unit.

15. A method for operating an internal combustion engine system, the method comprising:
    combusting a fuel and air mixture within a combustion chamber of an internal combustion engine, thereby forming an exhaust gas;
    performing a secondary procedure, the secondary procedure comprising:
       passing the exhaust gas from the combustion chamber to an aftertreatment system comprising one or more catalysts;
       reacting the exhaust gas in the aftertreatment system, thereby forming a treated exhaust gas, wherein the treated exhaust gas comprises less criteria pollutants than the exhaust gas from the combustion chamber;
       passing the treated exhaust gas to a storage unit comprising one or more sorbent materials; and
       prior to passing the treated exhaust gas to the storage unit, cooling the treated exhaust gas, wherein cooling the treated exhaust gas comprises passing the treated exhaust gas through a waste heat recovery unit comprising at least one of an electric turbo compound, a thermoelectric generator, and a Rankine cycle system; and
    subsequent to performing the secondary procedure, performing a regeneration procedure, the regeneration procedure comprising:
       passing the exhaust gas from the combustion chamber to the storage unit;

heating the storage unit above a release temperature with the exhaust gas, thereby releasing stored criteria pollutants from the storage unit;

passing the released criteria pollutants from the storage unit to the aftertreatment system; and reacting the released criteria pollutants with the aftertreatment system.

16. The method of claim 15, further comprising, subsequent to performing the regeneration procedure, resuming the secondary procedure.

17. The method of claim 15, wherein the criteria pollutants comprise at least one of carbon monoxide, nitrogen oxides, and hydrocarbons.

18. The method of claim 15, further comprising performing a startup procedure comprising:

passing the exhaust gas from the combustion chamber to the storage unit;

capturing criteria pollutants of the exhaust gas with the storage unit; and passing the exhaust gas from the storage unit to the aftertreatment system.

19. The method of claim 18, wherein the startup procedure further comprises heating the aftertreatment system to an activation temperature with the exhaust gas from the storage unit.

* * * * *